United States Patent [19]
Binkley

[11] 3,747,887
[45] July 24, 1973

[54] WIND WEIGHT

[76] Inventor: Jonathan A. Binkley, 1786 Bucklew Dr., Toledo, Ohio 43613

[22] Filed: Dec. 13, 1971

[21] Appl. No.: 207,103

[52] U.S. Cl............................................. 248/361 R
[51] Int. Cl............................................... A47c 7/00
[58] Field of Search............ 248/361 R, 158, 188.1, 248/346; 40/125 H, 125 J; 16/1

[56] References Cited
UNITED STATES PATENTS

| | | | |
|---|---|---|---|
| 1,717,718 | 6/1929 | Marshall | 40/125 H |
| 2,373,439 | 4/1945 | Wheatley | 248/361 |
| 3,288,413 | 11/1966 | Gregory | 248/346 |
| 3,302,011 | 1/1967 | Katzel | 248/364 |
| 3,415,475 | 12/1968 | Goodman | 248/188.1 |

*Primary Examiner*—Edward C. Allen

[57] ABSTRACT

A set of hold downs for securing lightweight tubular aluminum furniture out-of-doors, such as on a patio, so to prevent gusts of high wind from knocking it over or blowing it away, the hold down consisting of a pair of wind weight placeable across a front and rear bar of a chair, lounge or the like, each wind weight comprising a hollow container that can be filled either with water, sand, cement or etc., and which can be in any decorative design for a pleasing appearance.

1 Claim, 7 Drawing Figures

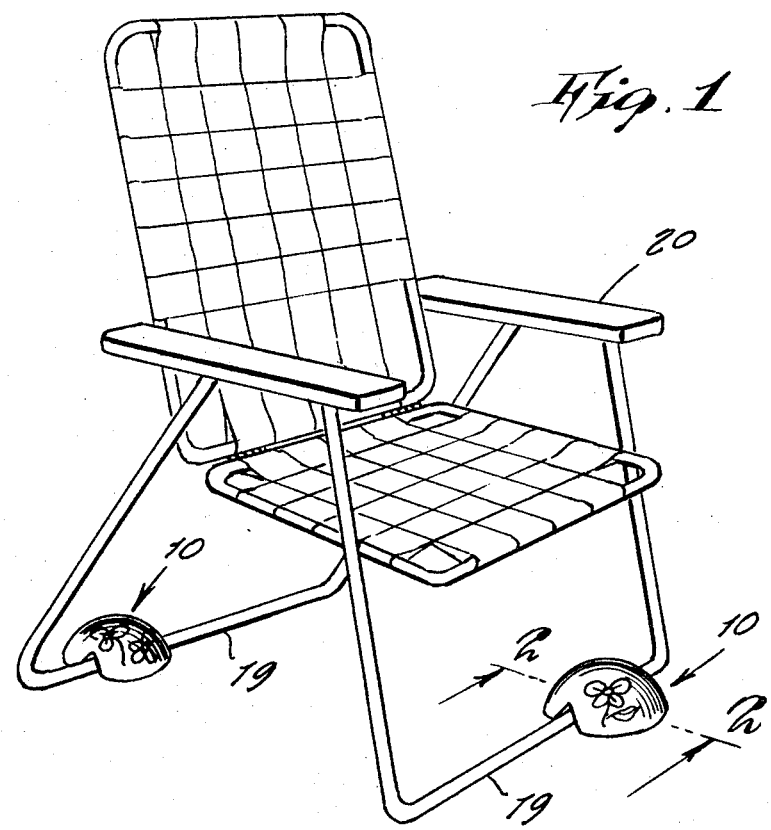
Fig. 1
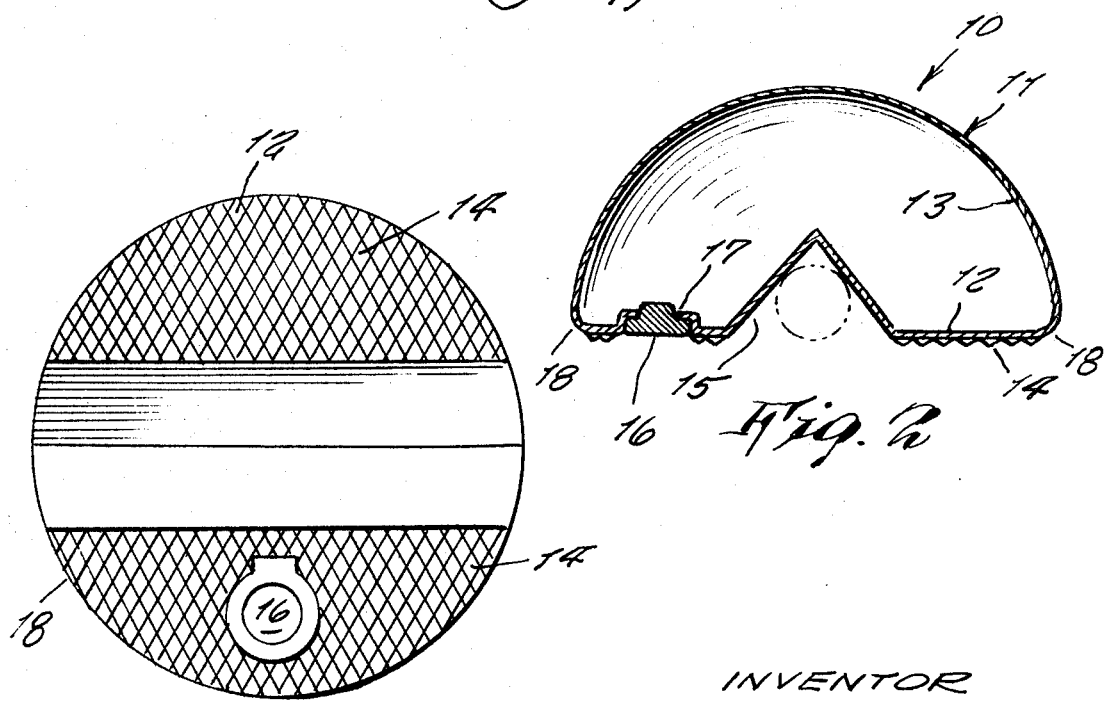
Fig. 3
Fig. 2
INVENTOR
JONATHAN A. BINKLEY

INVENTOR
JONATHAN A. BINKLEY

WIND WEIGHT

This invention relates generally to hold downs.

A principal object of the present invention is to provide a set of wind weights so to secure lightweight, tubular aluminum furniture out-of-doors, and prevent it from being knocked over is a high wind and blown away.

Another object is to provide a wind weight which can be made in various attractive designs of flowers, insects, emblems or the like.

Yet another object is to provide a wind weight consisting of a hollow container that can be filled with any handy weight material such as sand, pebbles, dirt or water.

Yet another object is to provide a wind weight which does not in any way detract to the appearance of out-of-doors furniture, and which can add to the decor thereof by being made in varioud colors so to harmonize with the colors of the seating or pillow material.

Other objects are to provide a wind weight which is simple in design, inexpensive to manufacture, rugged in construction, easy to use, and efficient in operation.

These and other objects will be readily apparent upon a study of the following specification and the accompanying drawing, wherein:

FIG. 1 is a perspective view of the invention in use on an out-of-door light weight chair or othr furniture.

FIG. 2 is a side cross-sectional view on line 2—2 of FIG. 1, shown enlarged.

FIG. 3 is a bottom view thereof.

Figure 4:
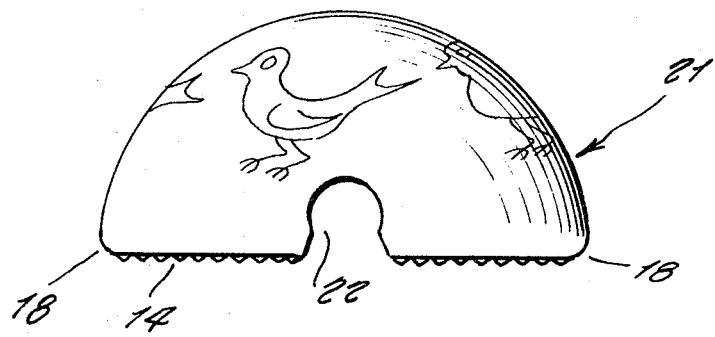
FIGS. 4 to 6 are side views of modified designs of the invention.

Referring now to the drawing in detail, and more particularly to FIGS. 1 to 3 at this time, the reference numeral 10 represents a wind weight accoridng to the present invention wherein there is a hollow container 11 consisting of a flat, circular bottom disc 12 and an upwardly convex upper member 13. The disc 12 on its underside has a grooved tread 14 so to prevent slippage. An inverted V-groove 15 extnds dramatically across the bottom, and a snap lock cap 16 is provided to close a fill opening 17. The container 11 is made preferably of nylon/plastic material that is one-sixteenth of an inch thick. The diameter of the conatiner is 6 inches, and is three inches high. The convex outer side of the member 13 may be decorated with designs of flowers, birds, insects or emblems. The inverted V-shaped groove is 2 inches wide so to adequately straddle a 1 inch diameter chair bar. The rounded peripheral edge 18 will prevent scuffing other objects, and improves appearance.

In operative use, one of the wind weights 10 is placed upon each of the front and rear transverse bracing bars 19 of a patio aluminum chair 20 or other lightweight furniture, thus holding down the furniture in a strong wind. In placing the wind weight, the bars are fitted through the inverted V-shaped grooves. As shown in FIG. one, the wind weights are best staggered along opposite ends of the bars 19 for better hold in a shifting wind.

Figure 5:
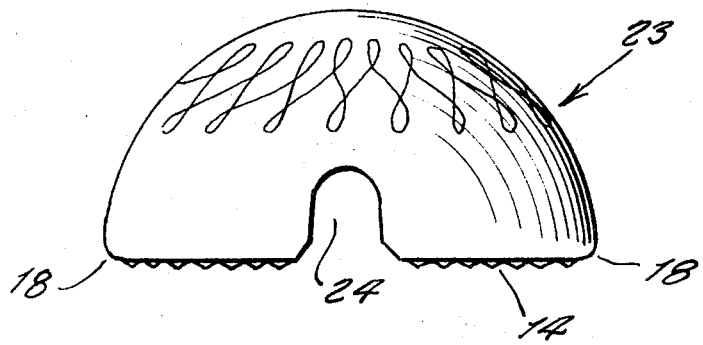
Figure 6:
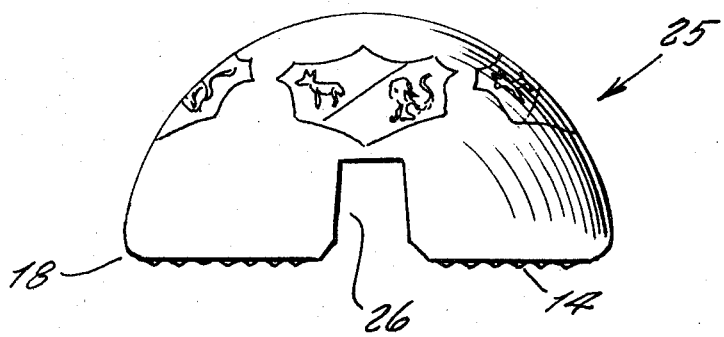

Referring now to FIG. 4, a modified design of wind weight 21 has a snap-in type lock crotch 22 instead of the inverted V-shaped groove. The crotch 22 assures the weight remaining engaged to the chair even when knocked over, thus still weighing it down so to prevent being blown away. Also this design permits a chair to be lifted by a person and be relocated without giving any special attention to placement of the weights thereupon. In FIG. 5, another modified wind weight 23 has a pinched-on tapered crotch 24 having the effect of "biting" onto standard aluminum lawn chair bottom leg rings. In FIG. 6 another wind weight 25 shows a further modified tapered crotch 26.

Figure 7:
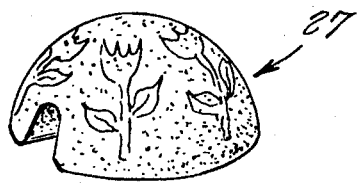
FIG. 7 is a perspective view of the invention formed of cast solid concrete.

In a further modified form of the invention shown in FIG. 7, the wind weight 27 may be made of cast solid concrete instead of the above described hollow container; the concrete wind weight including all the features of decorativeness on top, the tread on the bottom, and being made with any of the above described crotches or groove.

While various changes may be made in the detail construction, it is understood that such changes will be within the spirit and scope of the present invention as is defined by the appended claims.

I claim:

1. In a wind weight, the combination of a device for placement across a lower bar of lightweight out-of-door chairs or other furniture and holding it down in a high wind, said wind weight comprising a generally hemispherical member having a circular bottom wall, and an upwardly convex upper side, said bottom wall having a transverse groove or crotch for being fitted over said lower bar of said chair or furniture, said groove being generally diametrical by extending across the entire space of said bottom wall, said bottom wall being provided with a grooved tread to prevent slipping, said crotch being of various tapered or snap-on shape, said member comprising a hollow container with a capped opening for being filled with any handy material such as sand, dirt or water.

* * * * *